US011800069B2

(12) United States Patent
Natori

(10) Patent No.: US 11,800,069 B2
(45) Date of Patent: Oct. 24, 2023

(54) DISPLAY CONTROL METHOD, DISPLAY DEVICE, AND VIDEO OUTPUT DEVICE

(71) Applicant: SEIKO EPSON CORPORATION, Tokyo (JP)

(72) Inventor: Takashi Natori, Suwa (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 17/831,489

(22) Filed: Jun. 3, 2022

(65) Prior Publication Data

US 2022/0394220 A1 Dec. 8, 2022

(30) Foreign Application Priority Data

Jun. 4, 2021 (JP) ................. 2021-094137

(51) Int. Cl.
H04N 9/31 (2006.01)
(52) U.S. Cl.
CPC ......... H04N 9/3102 (2013.01); H04N 9/3179 (2013.01)
(58) Field of Classification Search
CPC .. H04N 9/3102; H04N 9/3179; H04N 9/3147; G09G 2340/04; G09G 2340/00; G09G 2370/20; G09G 5/14; G09G 5/373; G09G 5/38; G06F 3/1423; G06F 3/1454
See application file for complete search history.

(56) References Cited

U.S. PATENT DOCUMENTS

| 5,988,817 A | 11/1999 | Mizushima et al. |
| 2012/0026189 A1 | 2/2012 | Yokoyama et al. |
| 2013/0321701 A1* | 12/2013 | Halna Du Fretay ... G09G 3/002 348/512 |

FOREIGN PATENT DOCUMENTS

| JP | H10-301202 A | 11/1998 |
| JP | 2012-032508 A | 2/2012 |
| JP | 2012-039184 A | 2/2012 |
| JP | 2012-164319 A | 8/2012 |
| JP | 2012164319 A * | 8/2012 ........... G06F 3/1446 |

* cited by examiner

Primary Examiner — Lunyi Lao
Assistant Examiner — Kebede T Teshome
(74) Attorney, Agent, or Firm — Dority & Manning, P.A.

(57) ABSTRACT

A display control method includes outputting, by at least one video output device, M videos, M being an integer larger than or equal to 1, if M<N, displaying the M videos in each of M sub-areas by respectively assigning each of the M videos to each of the M sub-areas obtained by dividing a single large area in which an image is displayed by N display devices, N being an integer larger than or equal to 2, and if M=N, displaying each of the M videos by assigning each of the M videos to each of N display areas corresponding to the N display devices respectively.

10 Claims, 10 Drawing Sheets

DISPLAY CONTROL METHOD, DISPLAY DEVICE, AND VIDEO OUTPUT DEVICE

The present application is based on, and claims priority from JP Application Serial Number 2021-094137, filed Jun. 4, 2021, the disclosure of which is hereby incorporated by reference herein in its entirety.

BACKGROUND

1. Technical Field

The present disclosure relates to a display control method, a display device, and a video output device.

2. Related Art

In the past, there has been known a method of using a plurality of display devices such as projectors at the same time. JP-A-2012-164319 (Document 1) discloses an example in which the same number of display areas as the number of display devices are formed in a configuration in which the display devices are coupled to an image output device, and images output by the image output device and the display areas are made to correspond one-on-one to each other.

When using two or more display devices, it is conceivable to section or combine the display areas in a variety of aspects besides the example disclosed in Document 1. However, the operation of setting utilization forms of the display areas is cumbersome for the user.

SUMMARY

An aspect according to the present disclosure is directed to a display control method including the steps of outputting, by a display system including at least one video output device and N (N is an integer no smaller than 2) display devices, M (M is an integer no smaller than 1) videos with the video output device, dividing a whole of a display area of the N display devices into M sub-areas, and assigning one of the videos to each of the sub-areas to display the one of the videos in each of the sub-areas when M<N is true, and assigning one of the videos to display area of each of the display devices to display one of the videos in the display area when M=N is true.

Another aspect according to the present disclosure is directed to a display device configured to display videos in a display area, the display device including a coupler to be coupled to at least one video output device and (N−1) (N is an integer no smaller than 2) external display devices, and a display device controller configured to assign M (M is an integer no smaller than 1) videos output by the video output device to the display area and display areas of the external display devices to display the M videos in the display areas, wherein the display device controller divides a whole of the display area of the display device and the display areas of the external display devices into M sub-areas, and assigns one of the videos to each of the sub-areas to display the one of the videos in each of the sub-areas when M<N is true, and assigns one of the videos to the display area and the display area of each of the external display devices to display the one of the videos in the display area when M=N is true.

Still another aspect of the present disclosure is directed to a video output device which is coupled to N (N is an integer no smaller than 2) display devices and outputs M (M is an integer no smaller than 1) videos, the video output device including an output device controller configured to divide a whole of a display area of the N display devices into M sub-areas, and assign one of the videos to each of the sub-areas to display the one of the videos in each of the sub-areas with the display device when M<N is true, and assign one of the videos to display area of each of the display devices to make the display devices display the videos in the display areas when M=N is true.

DESCRIPTION OF EXEMPLARY EMBODIMENTS

1. First Embodiment

An embodiment of the present disclosure will hereinafter be described with reference to the drawings.

1-1. Configuration of Display System

Figure 1:
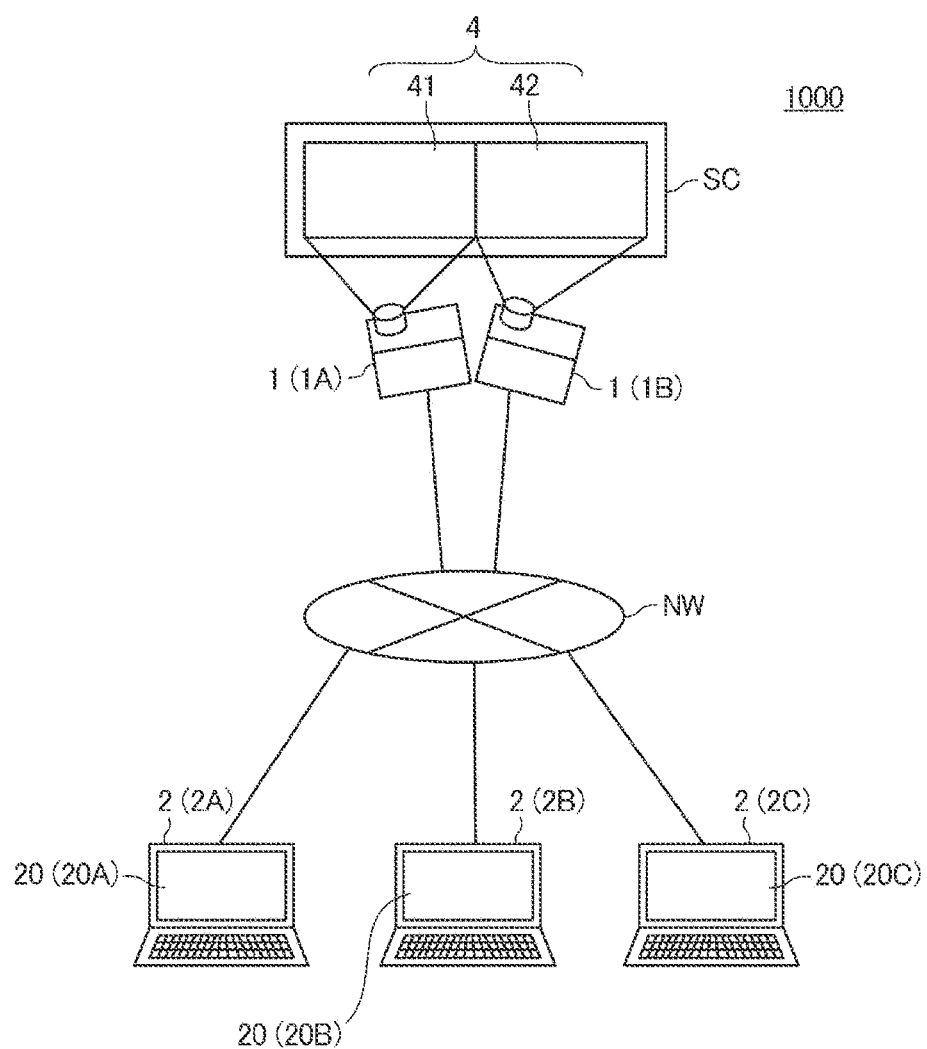
FIG. 1 is a diagram showing a configuration of a display system.

FIG. 1 is a diagram showing a configuration of a display system 1000.

The display system 1000 includes a plurality of projectors 1, and at least one PC (Personal Computer) 2. There is no limitation in the number of the projectors 1 or the number of the PCs 2, and FIG. 1 shows a configuration of the display system 1000 including two projectors 1A, 1B, and three PCs 2A, 2B, and 2C as an example. When the projectors 1A, 1B are described as projectors 1 when not distinguished from each other, and the PCs 2A, 2B, and 2C are described as PCs 2 when not distinguished from each other. The projectors 1 correspond to an example of display devices, and the PCs 2 correspond to an example of video output devices. With respect to the projector 1A, the projector 1B corresponds to an example of an external display device.

The projectors 1 and the PCs 2 are connected to each other via a communication network NW so as to be able to perform data communication. The communication network NW can be a local network, or can also be a global network configured including dedicated lines, public networks, the Internet, and so on.

The PCs 2 are so-called video sources. The PCs 2 shown in FIG. 1 are each a notebook PC, but this is illustrative only. The PCs 2 can be any of a desktop PC, a tablet PC, and a smartphone. It is possible to use devices of different types for outputting videos instead of the PCs 2. For example, it is possible to use a DVD (Digital Versatile Disc) player or a network player.

The videos output by the PCs 2 are specifically digital video data, and a data format and so on of the digital video data are not limited. For example, the video data output by the PCs 2 can be assumed as data compliant with a variety of standards such as MPEG (Motion Picture Expert Group), and can also be data for performing streaming transmission of the videos. The video data to be output by the PCs 2 can be data accompanied with audio data.

In the present embodiment, the projectors 1 project the videos based on the video data output by the PCs 2 to the projectors 1. Projecting a video by the projectors 1 corresponds to an example of display. The video data to be output by the PCs 2 can be data for displaying a still image. In other words, it is possible for the display system 1000 to display a still image and a moving image, namely a video. In the video data output by the PCs 2, the configuration of the data is compliant with the data format of the video data no matter whether the projectors 1 are made to display still images or the projectors 1 are made to display moving images. Therefore, without regard to whether the content of the video to be displayed by the projectors 1 is a still image or a moving image, video is used in the present embodiment as the designation.

The projectors 1 project image light on a screen SC as a projection surface based on the video data output by the PCs 2 to thereby display the video on the screen SC. The screen SC can also be a curtain-like screen, or it is also possible to use a wall surface of a building, or a plane of an installation as the screen SC. The screen SC is not limited to a plane, but can also be a curved surface or a surface having asperity.

As shown in FIG. 1, in the present embodiment, an area in the screen SC in which the projector 1A projects a video is defined as a projection area 41. An area in which the projector 1B projects a video is defined as a projection area 42. The whole of an area in which the display system 1000 displays videos is an area obtained by combining the projection area 41 and the projection area 42 with each other. The area thus obtained is defined as a large area 4. The large area 4 corresponds to an entire display area.

1-2. Configuration of Projector

Figure 2:
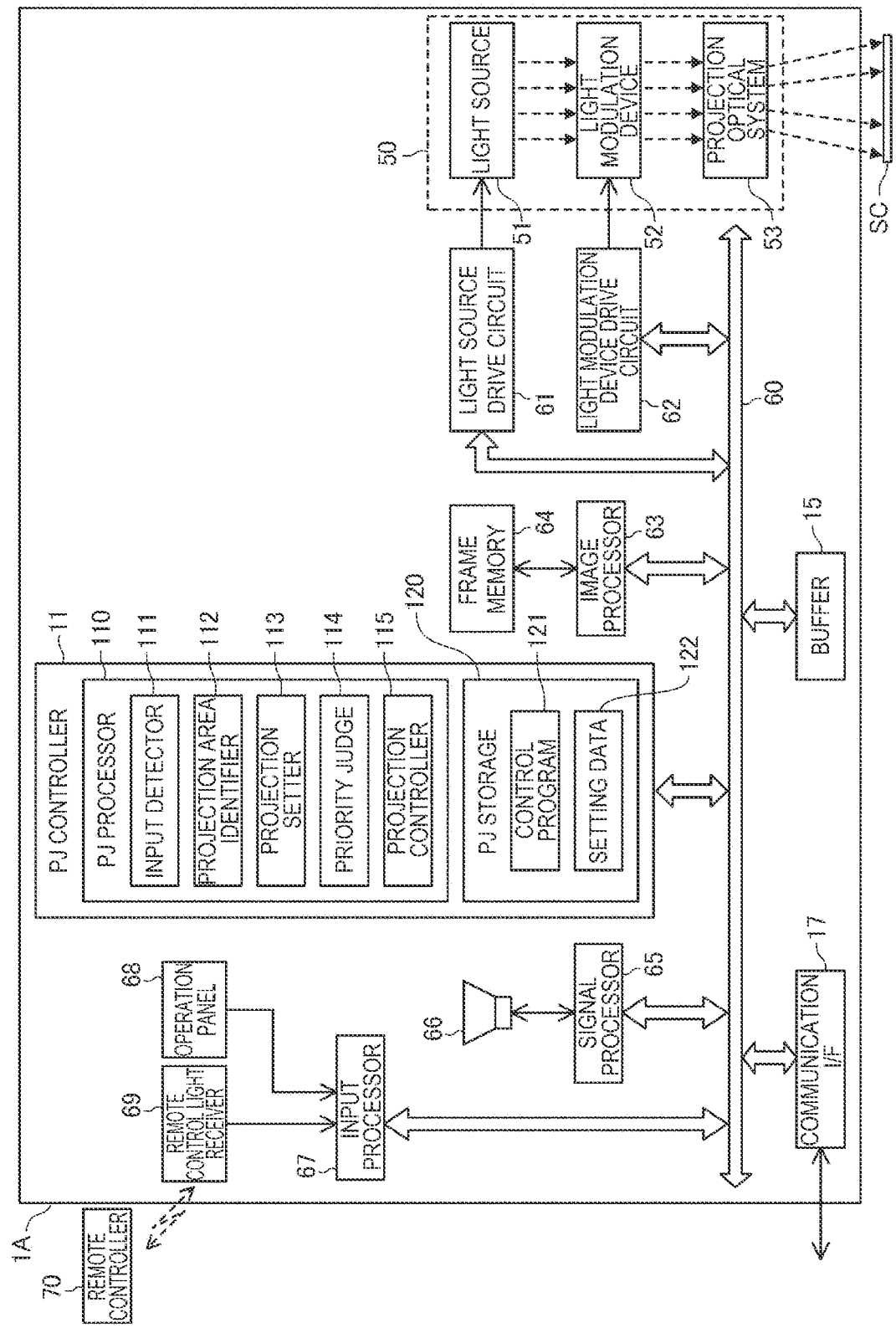
FIG. 2 is a diagram showing a configuration of a projector according to a first embodiment.

FIG. 2 is a diagram showing a configuration of the projectors 1 according to the first embodiment, and shows a configuration of the projector 1A.

The projector 1A is provided with a PJ (Projector) controller 11. The PJ controller 11 is provided with a PJ processor 110 formed of a CPU (Central Processing Unit), an MPU (Micro-processing unit), or the like, and a PJ storage 120. The PJ controller 11 executes a program with the PJ processor 110 to thereby control each constituent of the projector 1A. The PJ controller 11 corresponds to an example of a display device controller.

The PJ storage 120 is a nonvolatile storage device formed of a semiconductor memory element such as a flash memory. The PJ storage 120 stores the program to be executed by the PJ processor 110, data to be processed by the PJ processor 110, and so on. The PJ storage 120 stores, for example, a control program 121 and setting data 122. Further, it is also possible for the PJ storage 120 to be provided with a volatile storage area to form a work area for temporarily storing the program to be executed by the PJ processor 110 and the data as the processing target.

The PJ processor 110 retrieves and then executes the control program 121 stored in the PJ storage 120 to thereby execute a variety of types of processing with cooperation between hardware and software. The PJ processor 110 has operators such as an input detector 111, a projection area identifier 112, a projection setter 113, a priority judge 114, and a projection controller 115. These operators are configured by the PJ processor 110 executing the control program 121. The details of these operators will be described later.

The projector 1A is provided with a projector 50 for projecting the image light on the screen SC. The projector 50 includes a light source 51, a light modulation device 52, and a projection optical system 53. To the light source 51, there is coupled a light source drive circuit 61, and to the light modulation device 52, there is coupled a light modulation device drive circuit 62.

The light source 51 is formed of a lamp such as a halogen lamp, a xenon lamp, or a super-high pressure mercury lamp, or a solid-state light source such as an LED or a laser source. The light source 51 is put on by the electrical power supplied from the light source drive circuit 61, and emits light toward the light modulation device 52.

The light modulation device 52 is provided with three liquid crystal panels corresponding respectively to, for example, the three primary colors of R, G, and B. The character R represents red, the character G represents green, and the character B represents blue. The light emitted from the light source 51 is separated into colored light beams of three colors of RGB, and the colored light beams respectively enter the corresponding liquid crystal panels. The three liquid crystal panels are each a transmissive liquid crystal panel, and each modulate the light beam transmitted through the liquid crystal panel to generate an image light beam. The image light beams, which have been modulated while passing through the respective liquid crystal panels, are combined by a combining optical system such as a cross dichroic prism, and are then emitted to the projection optical system 53. The light modulation device 52 is not limited to the configuration provided with the transmissive liquid crystal panels as the light modulation elements. The light modulation element of the light modulation device 52 can be a liquid crystal panel of a reflective type, or can also be a digital mirror device (or a Digital Micromirror Device).

The projection optical system 53 is provided with a lens, a mirror, or the like for focusing the image light beam having been modulated by the light modulation device 52 on the screen SC. It is possible for the projection optical system 53 to be provided with a zoom mechanism, a focus adjustment mechanism for performing an adjustment of the focus, and so on.

The light source drive circuit 61 is coupled to the PJ controller 11 via a bus 60. The light source drive circuit 61 puts the light source 51 on or out in accordance with the control by the PJ controller 11.

The light modulation device drive circuit 62 is coupled to the PJ controller 11 via the bus 60. The light modulation device drive circuit 62 drives the light modulation device 52 in accordance with the control by the PJ controller 11 to draw an image in the light modulation elements provided to the light modulation device 52 frame by frame.

The projector 1A is provided with a buffer 15, a communication interface 17, and an image processor 63. These are coupled to the PJ controller 11 with the bus 60.

The communication interface 17 is provided with a wireless communication device for performing wireless data communication with wireless LAN (Local Area Network), Bluetooth, or the like, or a wired communication device for performing wired data communication through a cable. Here, the wireless communication device is provided with, for example, an antenna, an RF circuit, and a baseband circuit. The wired communication device is provided with, for example, a connector to which the cable is coupled, and an interface circuit for processing a signal which is transmitted or received via the connector. The communication interface 17 is connected to the communication network NW. The communication interface 17 performs communication with the PCs 2 and the projector 1B in accordance with the control by the PJ controller 11. Bluetooth is a registered trademark. The communication interface 17 corresponds to an example of a coupler.

The buffer 15 is a storage device which is formed of a semiconductor memory element and so on, and which has a volatile property or a nonvolatile property. Here, it is possible for the projector 1A to have a configuration in which a storage area provided to a single storage device is used as the buffer 15 and the PJ storage 120. The buffer 15 temporarily stores the video data received from the communication network NW by the communication interface 17.

To the image processor 63, there is coupled a frame memory 64. The frame memory 64 is a volatile storage device formed of an SDRAM (Synchronous Dynamic Random Access Memory) or the like. The image processor 63 develops the image to be projected by the projector 50 in the frame memory 64 frame by frame in accordance with the control by the PJ controller 11. The image processor 63 can perform image processing such as a resolution conversion process, a resizing process, a geometric correction process, a digital zoom process, and a luminance adjustment process on the image developed in the frame memory 14 in accordance with the control by the PJ controller 11. The image processor 63 outputs the image developed in the frame memory 64 to the light modulation device drive circuit 62.

The image processor 63 and the frame memory 64 can be formed of, for example, an integrated circuit. The integrated circuit of this kind includes an LSI, an ASIC (Application Specific Integrated Circuit), a PLD (Programmable Logic Device), an FPGA (Field-Programmable Gate Array), an SoC (System-on-a-chip), and so on. Further, an analog circuit can be included in a part of a configuration of the integrated circuit, or it is also possible to adopt a configuration in which the integrated circuit described above and the PJ controller 11 are integrated with each other.

The projector 1A is provided with a signal processor 65 and an input processor 67. These are coupled to the PJ controller 11 with the bus 60.

To the signal processor 65, there is coupled a speaker 66. The signal processor 65 outputs a sound from the speaker 66 based on digital audio data input from the PJ controller 11.

To the input processor 67, there are coupled an operation panel 68 and a remote control light receiver 69. The operation panel 68 is provided to a chassis of the projector 1A, and is provided with a variety of switches which can be operated by the user. The input processor 67 detects an operation of each of the switches of the operation panel 68. The remote control light receiver 69 receives an infrared signal transmitted by the remote controller 70. The input processor 67 decodes the signal received by the remote control light receiver 69 to generate operation data, and then outputs the operation data to the PJ controller 11. Thus, the input processor 67 receives the operation by the user using the operation panel 68 and the remote control light receiver 69, generates the operation data corresponding to the operation thus received, and then outputs the operation data to the PJ controller 11.

It is possible for the projector 1A to have an interface to be coupled to equipment as a video source in addition to the communication interface 17. For example, the projector 1A is provided with the interface provided with communication hardware such as a connector and an interface circuit compliant with a predetermined communication standard. This interface is a digital interface such as HDMI (High-Definition Multimedia Interface), Display Port, HDBaseT, or USB (Universal Serial Bus). HDMI and HDBaseT are each a registered trademark. Further, it is possible for the projector 1A to have a configuration which is provided with an analog video terminal such as an RCA terminal, a VGA terminal, an S terminal, or a D terminal as the interface, and is capable of receiving an analog video signal.

The input detector 111 detects the number of input videos in the display system 1000. For example, the input detector 111 detects the number of video sources included in the display system 1000, and the number of the videos output by the video sources. The PC 2A is capable of outputting at least one video through the communication network NW. It is possible to provide substantially the same configuration also to the PC 2B and the PC 2C. The input detector 111 detects the number of the PCs 2 which output videos to the projectors 1 in the display system 1000, and the number of the videos output by each of the PCs 2. The input detector 111 performs communication with the PCs 2 with, for example, the communication interface 17 to thereby detect the number of the video sources and the number of the videos.

The projection area identifier 112 identifies the number of, and a positional relationship between, the projection areas included in the display system 1000. In the configuration shown in FIG. 1, the projection area identifier 112 identifies the number of the projection area 41 and the projection area 42, and a relative positional relationship between the projection area 41 and the projection area 42. It is possible for the projection area identifier 112 to perform the communication with, for example, the projector 1B using the communication interface 17 to thereby identify the number of, and the positional relationship between, the projection areas. Further, it is possible for the projection area identifier 112 to identify the number of, and the positional relationship between, the projection areas based on the content input by the operation of the operation panel 68 or the remote controller 70. Further, it is possible for the projection area identifier 112 to identify the number of, and the positional relationship between, the projection areas based on control data transmitted from the PCs 2 through the communication network NW.

The projection setter 113 performs assignment of the videos in the whole of the projection areas of the display system 1000 identified by the projection area identifier 112, namely the large area 4.

Particularly, the projection setter 113 performs the processing of dividing the large area 4 in accordance with the number of the videos identified by the input detector 111, and then arranging the videos output by the PCs 2 in the large area 4. It is possible for the projection setter 113 to assign a single video to the whole of the large area 4. It is possible for the projection setter 113 to perform the division of the area and the assignment of the videos with respect to each of the projection area 41 and the projection area 42. The division of the large area 4, and the assignment of the videos to the areas obtained by dividing the large area 4 will be described later with reference to FIG. 4, FIG. 5, FIG. 6, and FIG. 7.

The projection setter 113 stores the configuration of the division of the large area 4 and the result of the assignment of the videos in the PJ storage 120 as the setting data 122.

When the PCs 2 output two or more videos, the priority judge 114 determines the priority of each of the videos. The priority of the video is relative ranking of each of the videos to be output by the PCs 2. It is possible for the projection setter 113 to perform processing of assigning the area in which the video is displayed in the large area 4 in accordance with the priority of the video. For example, to the video low in priority, there is assigned the area small in area in the large area 4.

It is possible for the projection setter 113 to control the display system 1000 so that the projector 1A and the projector 1B project the videos in accordance with the setting data 122. In this case, the projection setter 113 designates presence or absence of the division of the projection area 42, the number of the areas into which the projection area 42 is divided, the videos to be displayed in the respective areas obtained by dividing the projection area 42, and so on to the projector 1B in accordance with the assignment of the videos represented by the setting data 122 to make the projector 1B perform the projection. Further, it is possible for the projection setter 113 to designate an output destination to which the video is output through the communication network NW to the PCs 2A, 2B, and 2C. In this case, the projection setter 113 designates whether each of the videos is output to the projector 1A or is output to the projector 1B with respect to each of the video sources detected by the input detector 111 out of the PCs 2A, 2B, and 2C. Thus, it is possible to make the PC 2 as the video source output the video in accordance with the assignment determined by the projection setter 113.

The projector controller 115 controls the light source drive circuit 61, the light modulation device drive circuit 62, and the image processor 63 to project the video on the screen SC.

The projection controller 115 receives the video output from the PC 2 with the communication interface 17, and then projects the video thus received in accordance with the assignment set by the projection setter 113.

The configuration of the projector 1B can be made common to the projector 1A, and therefore, the illustration and the description thereof will be omitted. Here, the projector 1B can be provided with a configuration not provided with the input detector 111, the projection area identifier 112, the projection setter 113, and the priority judge 114. In other words, the projector 1B is not required to perform the processing performed by the projector 1A using the projection setter 113. The PJ controller 11 of the projector 1B projects the video output by the PC 2 in the projection area 42 using the projector 50 in accordance with the setting data 122 generated by the projector 1A.

When the display system 1000 includes three or more projectors 1, the third and subsequent projectors 1 can be provided with substantially the same configuration as that of the projector 1B. In other words, it is sufficient for any one of the projectors 1 provided to the display system 1000 to have a configuration shown in FIG.

1-3. Configuration of PC

Figure 3:
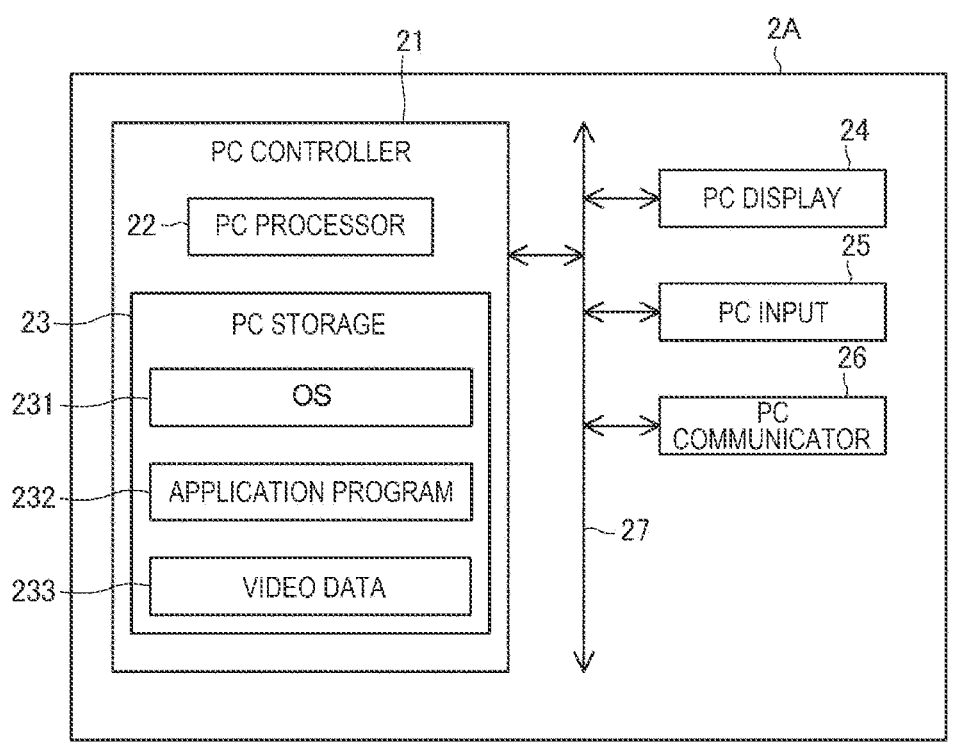
FIG. 3 is a diagram showing a configuration of a PC according to the first embodiment.

FIG. 3 is a diagram showing a configuration of the PC 2 in the first embodiment, and shows a configuration of the PC 2A as an example.

The PC 2A is provided with a PC controller 21, a PC display 24, a PC input 25, and a PC communicator 26, wherein these are coupled to each other with a bus 27.

The PC controller 21 includes a PC processor 22 and a PC storage 23. The PC processor 22 is formed of a processor such as a CPU or an MPU. The PC controller 21 executes a program with the PC processor 22 to thereby control each constituent of the PC 2A.

The PC storage 23 is a storage device for storing data in a nonvolatile manner with a flash memory, a magnetic recording medium, an optical recording medium, and so on. The PC storage 23 stores a program to be executed by the PC processor 22, data to be processed by the PC processor 22, and so on. The PC storage 23 stores, for example, an OS (Operating System) 231, an application program 232, and the video data 233. The OS 231 is basic control software for controlling the PC 2A, and provides a platform on which the application program 232 is executed. The application program 232 is a program having a function of outputting the video to the projector 1. The video data 233 is data of a video content, and is output to the projector 1 due to the function of the application program 232. The video data 233 can also include audio data.

The PC display 24 is provided with a display device. The display device is, for example, a display 20A shown in FIG. 1. The display 20A is configured including an LCD (Liquid Crystal Display) panel. Further, the display 20A can be provided with a configuration provided with a display panel such as an LED (Light Emitting Diode) panel or an OLED (Organic LED) panel. The PC display 24 displays an image or a video on the display device in accordance with the control by the PC controller 21. The PC display 24 can be provided with a configuration of being coupled to an external display device of the PC 2A.

The PC input 25 is provided with an input device to be operated by the user of the PC 2A, or is coupled to the input device. The input device is a switch panel having operation switches, a touch panel, a mouse, a keyboard, or the like. The PC input 25 detects the operation of the user on the input device, and outputs the detection result to the PC controller 21.

The PC communicator 26 is a communication device for performing communication with a predetermined communication standard. The PC communicator 26 is coupled to the communication network NW with wire or wireless communication. Further, it is possible to adopt a configuration in which a communication line or a communication device intervenes between the PC communicator 26 and the communication network NW. The PC communicator 26 performs the communication with the projectors 1 via the communication network NW in accordance with the control by the PC controller 21.

The configuration of the PC 2B can be made common to the PC 2A, and therefore, the illustration and the description thereof will be omitted. The same applies to the PC 2C, and when the display system 1000 includes four or more PCs 2, the fourth and the subsequent PCs 2 are provided with substantially the same configuration.

1-4. Aspect of Display in Display System

FIG. 4, FIG. 5, FIG. 6, and FIG. 7 are diagrams each showing a display example in the display system 1000.

Figure 4:
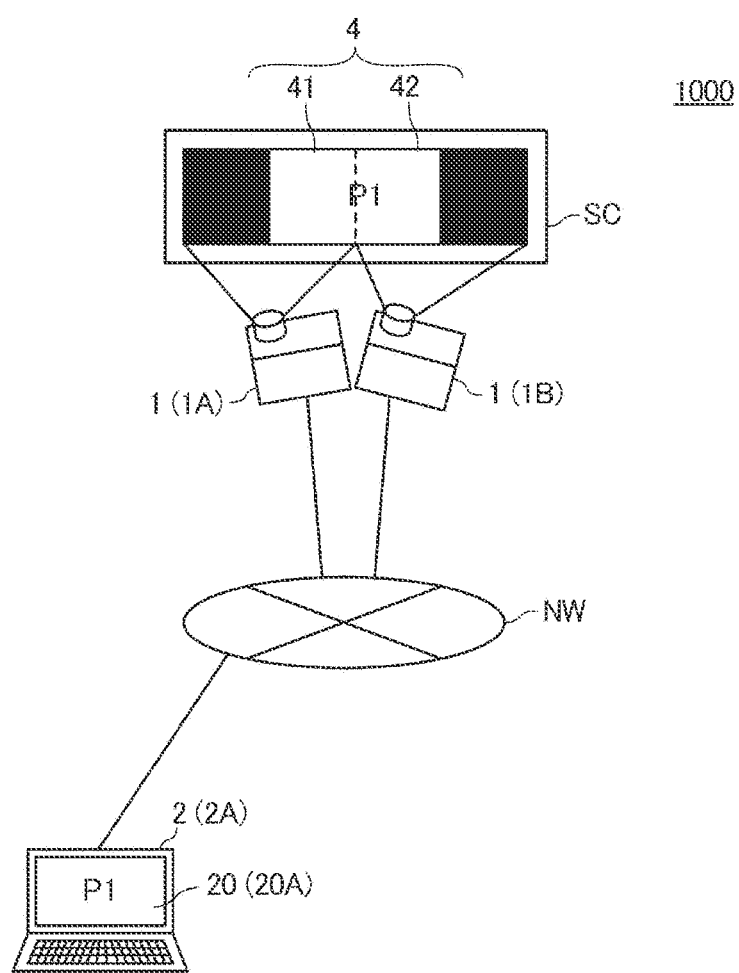
FIG. 4 is a diagram showing a display example in the display system.

FIG. 4 shows a display example when only the PC 2A outputs the video as the video source, and the PC 2A outputs a single video. The PC 2A outputs the same video as a first video P1 to be displayed on the display 20A due to the control by the PC controller 21.

The projection setter 113 of the projector 1A uses the large area 4 as a single area based on the fact that the single video, namely the first video P1, is output alone in the display system 1000. The projection setter 113 assigns the first video P1 to the whole of the large area 4. In this case, as shown in FIG. 4, the large area 4 is treated as a single large display area, and the first video P1 is displayed in the large area 4. In the example shown in FIG. 4, the first video P1 is displayed in the whole of the large area 4 in an enlarged manner while keeping an aspect ratio of the first video P1. It is possible for the projector 1 to display the first video P1 in the whole of the large area 4 in an enlarged manner with the aspect ratio of the first video P1 changed. Similarly in the display examples shown in FIG. 5 through FIG. 7, it is possible for the projector 1 to display the video in the large area 4 with the aspect ratio kept, or to change the aspect ratio.

Figure 5:
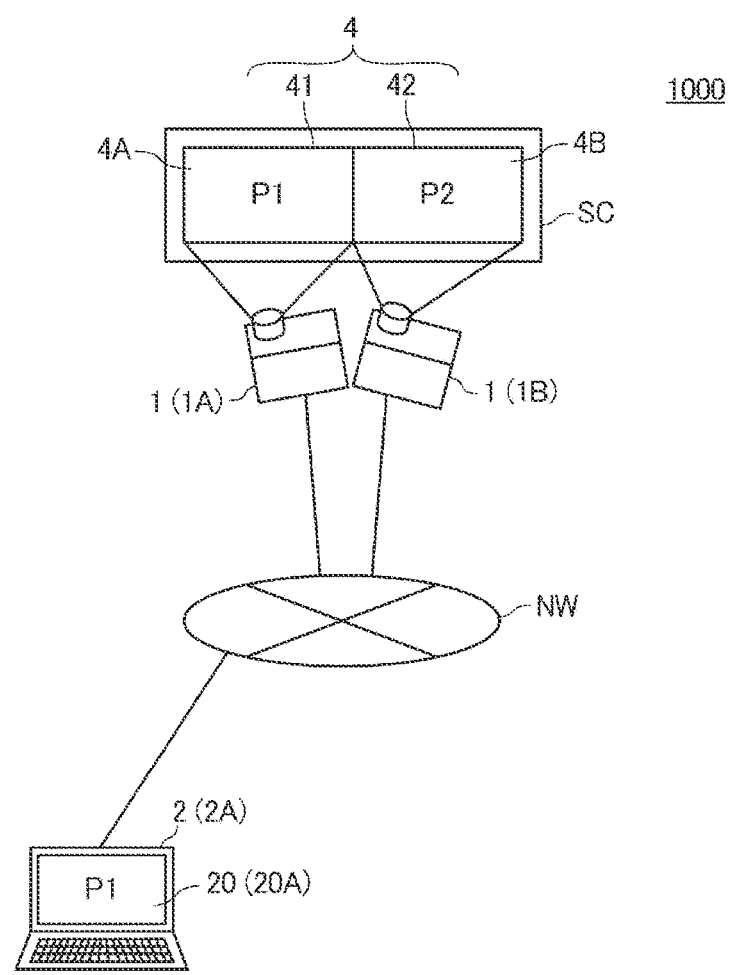
FIG. 5 is a diagram showing a display example in the display system.

FIG. 5 shows a display example when only the PC 2A outputs the video as the video source, and the PC 2A outputs two videos. The PC 2A outputs the first video P1 to be displayed on the display 20A, and a second video P2 which is not displayed on the display 20A due to the control by the PC controller 21.

The projection setter 113 of the projector 1A uses the large area 4 as two areas based on the fact that the two videos are output in the display system 1000. In this case, the projection setter 113 divides the large area 4 into the projection area 41 and the projection area 42. In other words, the projection setter 113 divides the large area 4 into small areas 4A, 4B. The small area 4A corresponds to the whole of the projection area 41, and the small area 4B corresponds to the whole of the projection area 42. The projection setter 113 assigns the first video P1 to the small area 4A, and assigns the second video P2 to the small area 4B. Thus, as shown in FIG. 5, the first video P1 is displayed in the projection area 41, and the second video P2 is displayed in the projection area 42. The small areas each correspond to an example of a sub-area.

Figure 6:
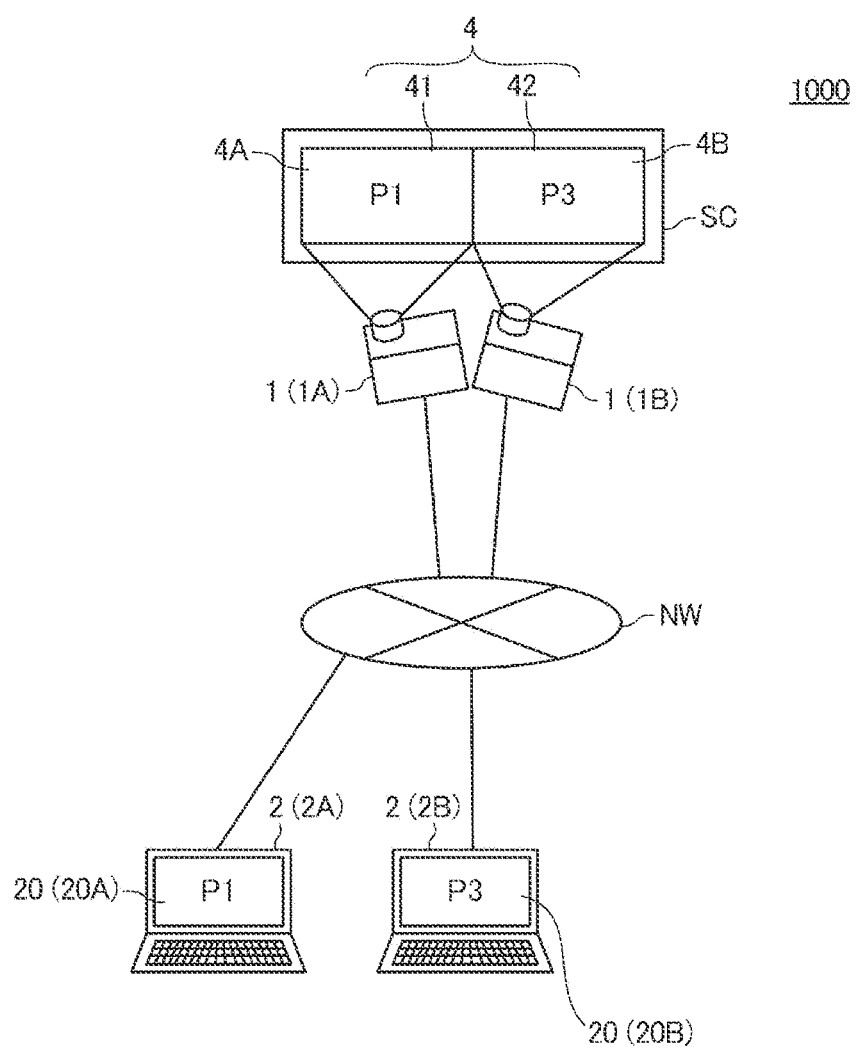
FIG. 6 is a diagram showing a display example in the display system.

FIG. 6 shows a display example when the PC 2A and the PC 2B output the videos as the video sources, and the PC 2A outputs a single video, and the PC 2B outputs a single video. The PC 2A outputs the first video P1 to be displayed on the display 20A due to the control by the PC controller 21. The PC 2B outputs the third video P3 to be displayed on the display 20B due to the control by the PC controller 21.

The projection setter 113 of the projector 1A uses the large area 4 as two areas based on the fact that the two videos are output in the display system 1000. In this case, the projection setter 113 divides the large area 4 into the projection area 41 and the projection area 42. In other words, the projection setter 113 divides the large area 4 into small areas 4A, 4B. The small area 4A corresponds to the whole of the projection area 41, and the small area 4B corresponds to the whole of the projection area 42. The projection setter 113 assigns the first video P1 to the small area 4A, and assigns the third video P3 to the small area 4B. Thus, as shown in FIG. 6, the first video P1 is displayed in the projection area 41, and the third video P3 is displayed in the projection area 42.

Figure 7:
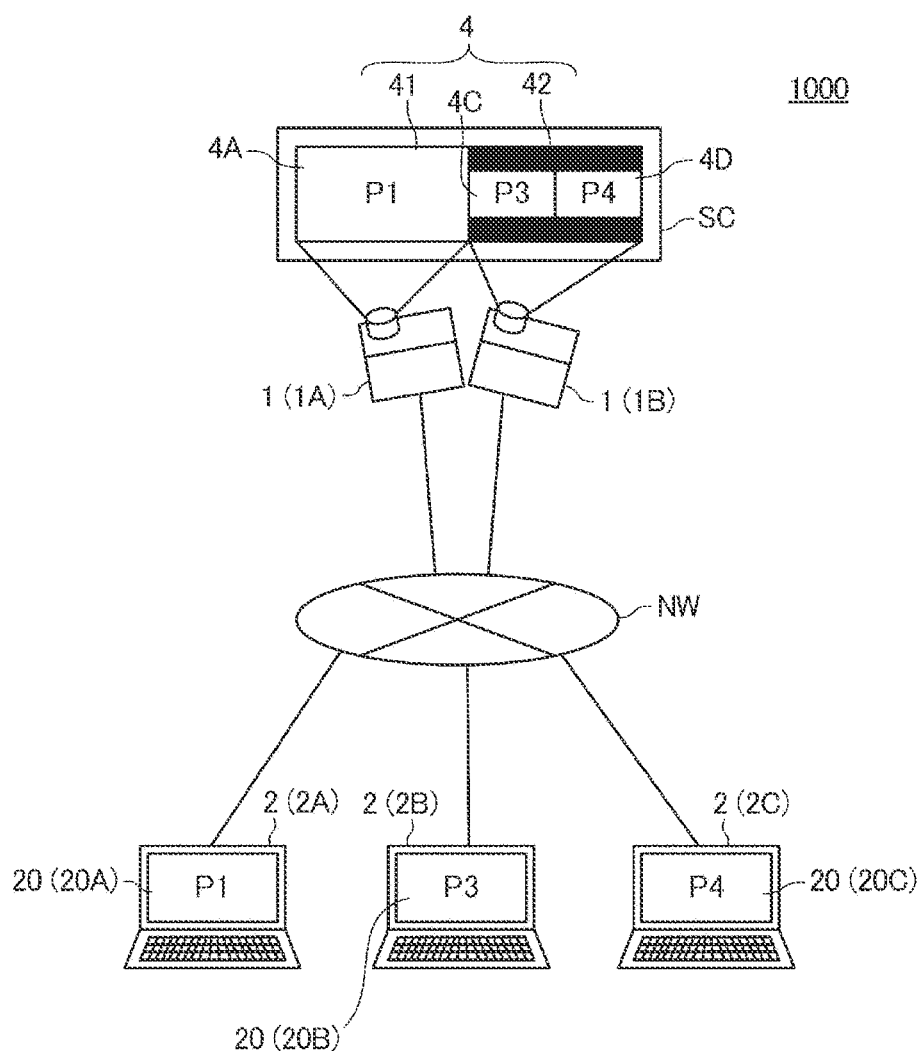
FIG. 7 is a diagram showing a display example in the display system.

FIG. 7 shows a display example when the PC 2A, PC 2B, and PC 2C each output a single video as the video sources. The PC 2A outputs the first video P1 to be displayed on the display 20A due to the control by the PC controller 21. The PC 2B outputs the third video P3 to be displayed on the display 20B due to the control by the PC controller 21. The PC 2C outputs a fourth video P4 to be displayed on the display 20C due to the control by the PC controller 21.

The priority judge 114 determines the priorities of the first video P1, the third video P3, and the fourth video P4. In the example shown in FIG. 7, the priority of the first video P1 determined by the priority judge 114 is higher than the priority of the third video P3 and the priority of the fourth video P4.

The projection setter 113 of the projector 1A uses the large area 4 as three areas based on the fact that the three videos are output in the display system 1000. In this case, the projection setter 113 divides the large area 4 into three areas different in area in accordance with the priorities determined by the priority judge 114. Specifically, the large area 4 is divided into the small area 4A equal to the projection area 41, and a small area 4C and a small area 4D included in the projection area 42. Since the small area 4A is larger in area compared to the small areas 4C, 4D, the video high in priority is assigned to the small area 4A. The videos lower in priority than the video in the small area 4A are assigned to the small areas 4C, 4D. Specifically, the projection setter 113 assigns the first video P1 to the small area 4A, and assigns the third video P3 and the fourth video P4 respectively to the small areas 4C, 4D.

It is possible for the projection setter 113 to perform the assignment corresponding to the priorities based on the resolutions of the display areas instead of the areas thereof.

As described above, the projection setter 113 defines the large area 4 as a single small area, or divides the large area 4 into two or more small areas in accordance with the number of the videos output by the PCs 2 in the display system 1000, and then assigns the video to each small area. Thus, it is possible to appropriately divide the large area 4 to display the at least one video without requiring the user of the PCs 2 to consider the assignment of the videos or perform the setting operation.

It is possible for the projection setter 113 to determine the priority made to correspond to each of the PCs 2. For example, the projection setter 113 can have the priorities set in advance respectively to the PCs 2A, 2B, and 2C. Further, it is also possible to set a higher priority in advance to some of the PCs 2 included in the display system 1000 than a priority of others. Further, it is possible for the projection setter 113 to determine the priorities of the PCs 2 based on the order in which the videos start to be output. In this case, the priorities determined with respect to the PCs 2 are reflected on the priorities of the videos output by the PCs 2. Further, it is possible for the projection setter 113 to determine the priorities based on attributes of data of the videos output by the PCs 2. For example, it is possible for the projection setter 113 to determine the priority of each of the videos based on the resolution, the frame rate, or the resolution and the frame rate of the video.

1-5. Operation of Display System

Figure 8:
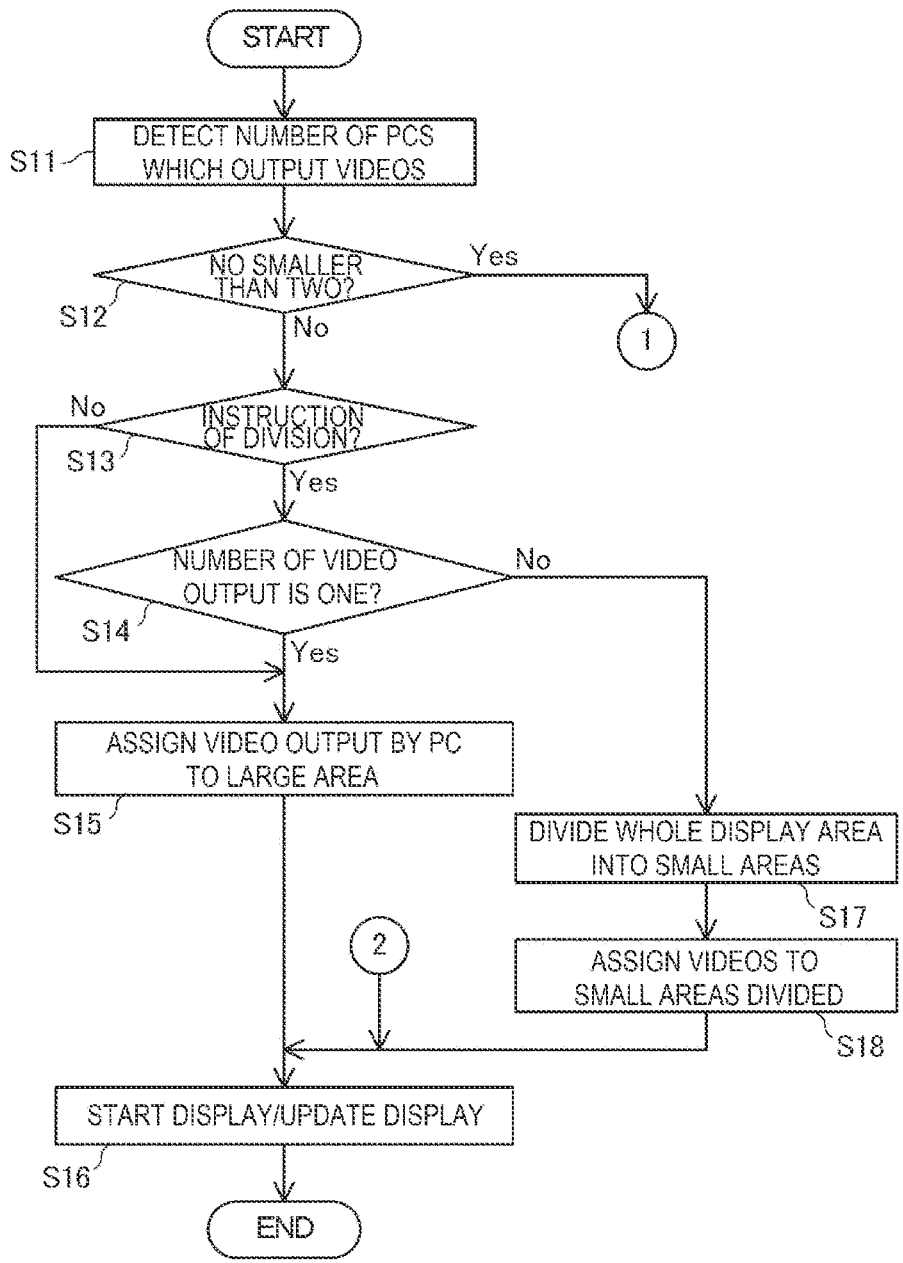
FIG. 8 is a flowchart showing an operation of the display system.
Figure 9:
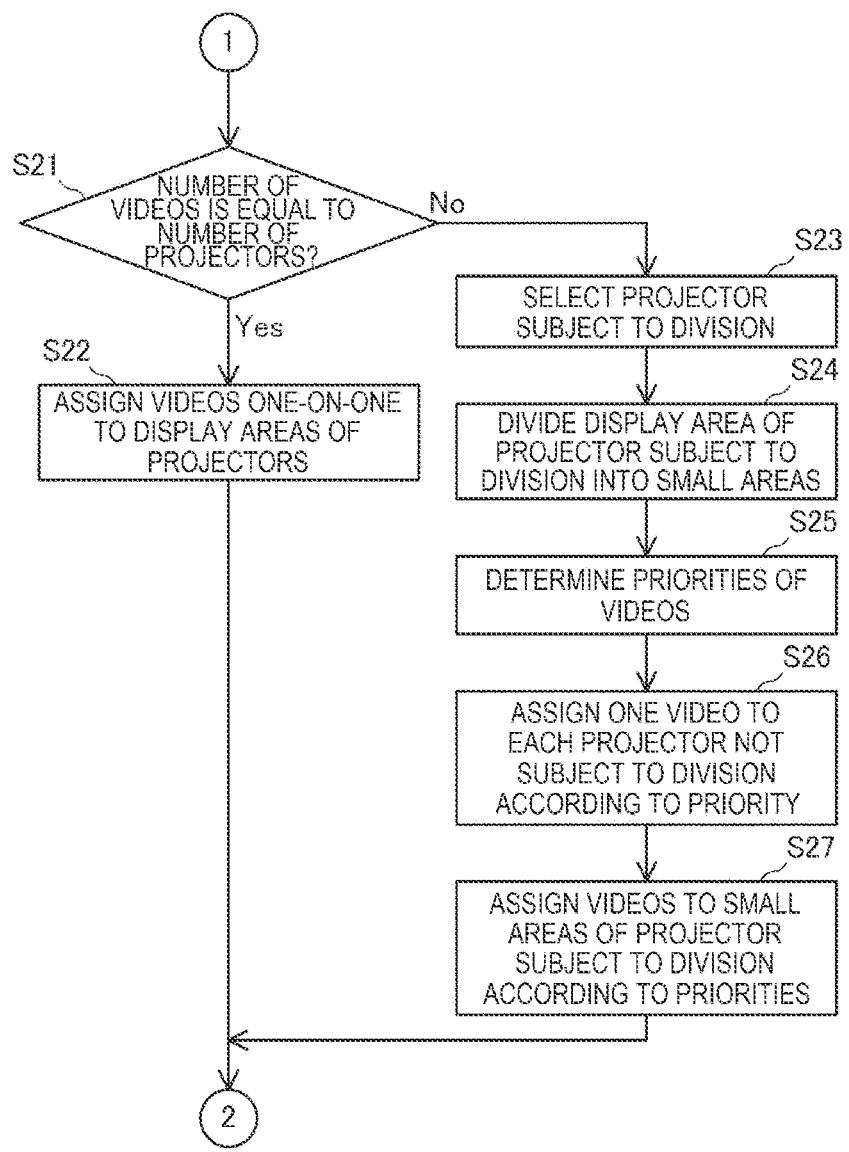
FIG. 9 is a flowchart showing an operation of the display system.

FIG. 8 and FIG. 9 are flowcharts showing an operation of the display system 1000.

In the first embodiment, the projector 1A performs the control shown in FIG. 8 and FIG. 9.

The PJ controller 11 detects (step S11) the number of the PCs 2 which output videos in the display system 1000 using the input detector 111. In the step S11, the input detector 111 can detect the number of the videos output by the PCs 2. In the following description, the number of the videos output by the PCs 2 is denoted by M, and the number of the projectors 1 is denoted by N. The number N is an integer no smaller than 2, and the number M is an integer no smaller than 1.

The projection setter 113 determines (step S12) whether or not the number of the PCs 2 detected by the input detector 111 is no smaller than 2. When the number of the PCs 2 detected by the input detector 111 is no smaller than 2 (YES in the step S12), the PJ controller 11 makes the transition to the step S21 (FIG. 9) described later.

When the number of the PCs 2 detected by the input detector 111 is 1 (NO in the step S12), the projection setter 113 determines (step S13) whether or not an instruction of dividing the large area 4 has been made. The instruction of the division is an instruction of dividing the large area 4 in accordance with the number of the videos output by the PCs 2. This instruction is achieved by, for example, the PC 2A transmitting control data to the projector 1A in accordance with an operation by the user, or by the user operating the operation panel 68 of the projector 1A or the remote controller 70.

When the instruction of dividing the large area 4 has been made (YES in the step S13), the projection setter 113 determines (step S14) whether or not the number of the videos detected by the input detector 111 is one, namely whether or not M=1 is true. When M=1 is true (YES in the step S14), the projection setter 113 assigns (step S15) a single video output by the PC 2 to the whole of the large area 4. Further, when the instruction of dividing the large area 4 is not made (NO in the step 313), the projection setter 113 performs the assignment in the step S15.

The projection controller 115 starts the display of the videos or updates the display of the videos by the projectors 1A, 1B in accordance with the assignment performed by the projection setter 113 (step S16).

When the number of the videos detected by the input detector 111 is not 1 (NO in the step S14), namely M>1 is true, the projection setter 113 divides (step S17) the large area 4 into two or more small areas. The projection setter 113 assigns (step S18) the videos to the respective small areas, and then makes the transition to the step S16.

In the steps S11 through S15, when the number of the PCs 2 is smaller than the number of the projectors 1, the PJ controller 11 divides the large area 4 in accordance with the number of the videos output by the PC2, or assuming the large area 4 as a single display area, and then displays the videos.

When the number of the PCs 2 is no smaller than the number of the projectors 1, the PJ controller 11 performs the processing in the steps S21 through S27.

In the step S21, the projection setter 113 determines (step S21) whether or not the number of the videos output by the PCs 2 is the same as the number of the projectors 1, namely M=N is true. When the number of the videos output by the PCs 2 is the same as the number of the projectors 1, namely M=N is true (YES in the step S21), the PJ controller 11 assigns (step S22) the videos output by the PCs 2 one-on-one to the display areas of the projectors 1. For example, as shown in FIG. 5, the PJ controller 11 assigns the video of the PC 2A to the projection area 41, and assigns the video of the PC 2B to the projection area 42. After the processing in the step S22, the PJ controller 11 makes the transition to the step S16.

When the number of the videos output by the PCs 2 is not the same as the number of the projectors 1, namely M>N is true (NO in the step S21), the projection setter 113 selects (step S23) the projector 1 subject to division. The projector 1 subject to division means the projector 1 in which the division of the projection area is performed. In the processing in the step S23 and the subsequent steps, the projection setter 113 divides the projection area with respect to only some of the projectors 1 provided to the display system 1000, or assigns the video without dividing the projection area with respect to some of the projectors 1. In the step S23, the projection setter 113 selects at least one of the projectors 1. For example, the projection setter 113 selects the projector 1 at the endmost position as the projector 1 subject to division based on the relative positions of the projectors 1 identified by the projection area identifier 112. The projector 1 selected in the step S23 corresponds to an example of a division target display device.

The projection setter 113 divides (step S24) the projection area of the projector 1 subject to division into two or more small areas. The number of the small areas into which the projection setter 113 divides the projection area in the step S24 can be obtained as M−N+1. Here, the PJ controller 11 determines (step S25) the priorities of the videos output by the PCs 2 using the priority judge 114.

The projection setter 113 assigns (step S26) the videos one by one to the display areas of the projectors 1 not subject to division in the descending order of the priority. Thus, the video high in priority is displayed in the whole of the display area of one projector 1.

The projection setter 113 assigns (step S27) the videos one by one to the small areas divided in the step S24. In the step S27, the projection setter 113 assigns the video low in priority to the small area.

Due to the processing in the steps S26 through S27, the videos are assigned to the display area of the projector 1 subject to division in the ascending order of the priority, and the videos higher in priority than these videos are assigned to the display area of the projectors 1 not subject to division. After the processing in the step S27, the PJ controller 11 makes the transition to the step S16.

1-6. Overview of First Embodiment

As described hereinabove, the display system 1000 according to the first embodiment includes the at least one PC 2, and the N (N is an integer no smaller than 2) projectors 1. The display control method according to the present disclosure is a display control method including the steps of outputting, by the PCs 2, M (M is an integer no smaller than 1) videos, dividing the large area 4 as the whole of the projection area of the N projectors 1 into the M small areas 4A, 4B to assign one of the videos to each of the small areas 4A, 4B to display the videos when M<N is true, and assigning one of the videos to each of the projection areas 41, 42 of the projectors 1 to display the videos when M=N is true.

According to the display control method related to the present disclosure, it is possible to appropriately assign the videos to the large area 4 to display the videos in accordance with the number of the videos output by the PCs 2 without placing a burden on the user who operates the PCs 2.

The display device according to the present disclosure is the projector 1A for displaying the video in the projection area, and is provided with the communication interface 17 to be connected to the at least one PC 2, and the projector 1B as the (N−1) (N is an integer no smaller than 2) external projectors 1. The projector 1A is provided with the PJ controller 11 for assigning the M (M is an integer no smaller than 1) videos output by the at least one PC 2 to the projection area and a projection area of the external projector 1 to display the videos. The PJ controller 11 divides the whole of the projection area 41 of the projector 1A and the projection area 42 of the projector 1B into the M small areas 4A, 4B to assign one of the videos to each of the small areas 4A, 4B to display the videos when M<N is true, and assign one of the videos to each of the projection area 41 and the projection area 42 to display the videos when M=N is true.

According to the projector 1A related to the present disclosure, it is possible to appropriately assign the videos to the large area 4 to display the videos in accordance with the number of the videos output by the PCs 2 without placing a burden on the user who operates the PCs 2.

The display control method described above can be applied when outputting a plurality of videos from the single PC 2. In this case, it is possible to appropriately assign the videos to the large screen 4 in accordance with the number of videos output by the PC 2 instead of the number of the PCs 2.

In the display control method described above, when N<M is true, one of the projectors 1 is set as the projector 1 subject to division, and one of the videos is assigned to each of the N−1 projectors 1 except the projector 1 subject to division to perform display, and the projection area of the projector 1 subject to division is divided into (M−N+1) small areas, and one of the videos is assigned to each of the small areas to perform display. Thus, it becomes possible to divide the projection area to display a larger number of videos than the number of the projectors 1 in the large area 4. Further, by performing the processing of selecting the projector 1 subject to division, it becomes possible to display the videos in larger sizes with the projectors 1 not subject to division. Further, even when the number N of the projectors 1 is not a multiple of the number M of the videos to be output by the PCs 2, it is possible to display the videos in an aspect excellent in visibility.

In the display control method described above, there are further included the steps of determining the priorities of the M videos output by the PCs 2, and displaying the (M−N+1) videos relatively lower in priority using the projector 1 subject to division. Thus, it is possible to display the plurality of videos output by the PCs 2 in the large area 4, and further, display the video higher in priority in an aspect more excellent in visibility.

2. Second Embodiment

Figure 10:
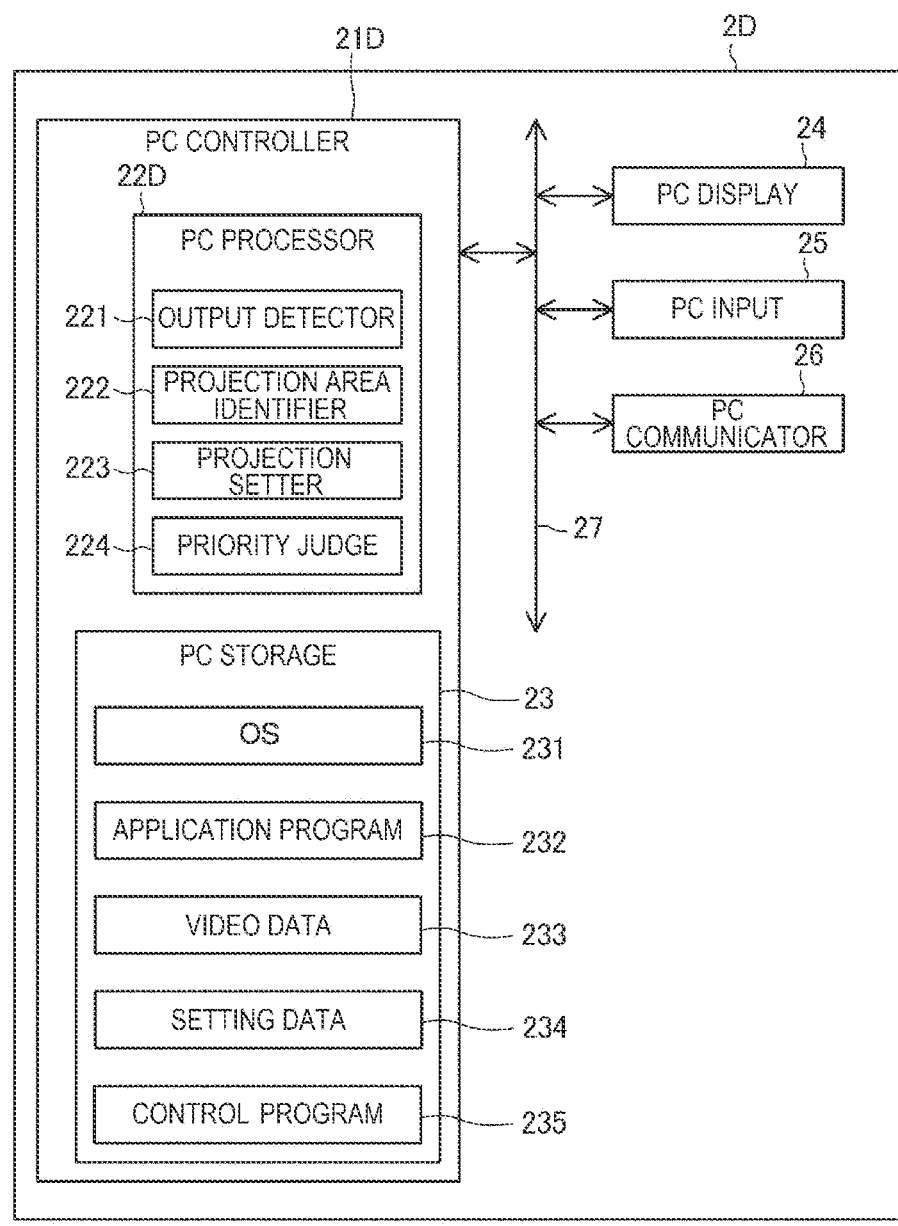
FIG. 10 is a diagram showing a configuration of a PC according to a second embodiment.

FIG. 10 is a diagram showing a configuration of a PC 2 in a second embodiment, and shows a configuration of a PC 2D.

A display system 1000 according to the second embodiment includes at least one PC 2D. For example, the display system 1000 has a configuration obtained by replacing the PCs 2A, 2B, and 2C described in the first embodiment with the PC 2D, or further including the PC 2D in the display system 1000 in addition to the PCs 2A, 2B, and 2C.

Similarly to the PC 2A, the PC 2D has the PC storage 23, the PC display 24, the PC input 25, the PC communicator 26, and the bus 27.

The PC 2D is provided with a PC controller 21D. The PC controller 21D includes a PC processor 22D and the PC storage 23. The PC processor 22D is formed of a processor such as a CPU or an MPU. The PC controller 21D executes a program with the PC processor 22D to thereby control each constituent of the PC 2D. The PC controller 21D corresponds to an example of an output device controller.

The PC storage 23 stores setting data 234 and a control program 235.

The PC processor 22D is provided with an output detector 221, a projection area identifier 222, a projection setter 223, and a priority judge 224. By the PC processor 22D executing the control program 235, these operators are realized by the cooperation between software and hardware.

The output detector 221 detects the number of the videos output by the PCs 2 in the display system 1000. The number of the videos detected by the output detector 221 includes the number of the videos output by the PC 2D, and the number of the videos output by the PCs 2 except the PC 2D. The output detector 221 performs communication with the other PCs 2 with, for example, the PC communicator 26 to thereby detect the number of the video sources and the number of the videos similarly to the input detector 111.

The projection area identifier 222 functions in substantially the same manner as the projection area identifier 112. The projection area identifier 222 identifies the number of, and a positional relationship between, the projection areas included in the display system 1000. For example, the projection area identifier 222 identifies the number of the projection area 41 and the projection area 42 shown in FIG. 1, and a relative positional relationship between the projection area 41 and the projection area 42. It is possible for the projection area identifier 222 to perform the communication with, for example, the projectors 1A, 1B using the PC communicator 26 to thereby identify the number of, and the positional relationship between, the projection areas. Further, it is possible for the projection area identifier 222 to identify the number of, and the positional relationship between, the projection areas based on the content input by the PC input 25.

The projection setter 223 performs assignment of the videos in the whole of the projection areas of the display system 1000 identified by the projection area identifier 222, namely the large area 4.

For example, in particular, the projection setter 223 performs the processing of dividing the large area 4 in accordance with the number of the videos identified by the output detector 221, and then arranging the videos output by the PCs 2 in the large area 4. It is possible for the projection setter 223 to assign a single video to the whole of the large area 4. It is possible for the projection setter 223 to perform the division of the area and the assignment of the videos with respect to each of the projection area 41 and the projection area 42. The division of the large area 4, and the assignment of the videos to the areas obtained by dividing the large area 4 are substantially the same as the operation of the projection setter 113 described with reference to FIG. 4, FIG. 5, FIG. 6, and FIG. 7.

The projection setter 223 stores the configuration of the division of the large area 4 and the result of the assignment of the videos in the PC storage 23 as the setting data 234.

When the PCs 2 output two or more videos, the priority judge 224 determines the priority of each of the videos. The priority of the video is relative ranking of each of the videos to be output by the PCs 2. It is possible for the projection setter 223 to perform processing of assigning the area in which the video is displayed in the large area 4 in accordance with the priority of the video. For example, to the video low in priority, there is assigned the area small in area in the large area 4.

The projection setter 223 controls the display system 1000 so that the projector 1A and the projector 1B project the videos in accordance with the setting data 234. In this case, the projection setter 223 designates presence or absence of the division of the projection area 42, the number of the areas into which the projection area 42 is divided, the videos to be displayed in the respective areas obtained by dividing the projection area 42, and so on to the projector 1A and the projector 1B in accordance with the assignment of the videos represented by the setting data 234 to make the projector 1A and the projector 1B perform the projection. Further, it is possible for the projection setter 223 to designate an output destination to which the video is output through the communication network NW to the PCs 2A, 2B, and 2C. In this case, the projection setter 223 designates whether each of the videos is output to the projector 1A or is output to the projector 1B with respect to each of the video sources detected by the output detector 221 out of the PCs 2A, 2B, and 2C. Thus, it is possible to make each of the PCs 2 as the video source output the video in accordance with the assignment determined by the projection setter 223.

In the second embodiment, the PC controller 21D performs the functions of the input detector 111, the projection area identifier 112, the projection setter 113, and the priority judge 114 described with reference to FIG. 8 and FIG. 9. Thus, as described in the first embodiment, it is possible to set the display configuration of the videos in the large area 4 based on the number M of the videos output by the PCs 2, and the number N of the projectors 1. These functions can be performed by the PC 2D.

In the second embodiment, the projectors 1A, 1B can both be provided with a configuration not provided with the input detector 111, the projection area identifier 112, the projection setter 113, and the priority judge 114.

As described above, the PC 2D in the second embodiment according to the present disclosure is a video output device which is coupled to the N (N is an integer no smaller than 2) projectors 1, and outputs the M (M is an integer no smaller than 1) videos. The PC 2D uses the PC controller 21D to divide the whole of the projection areas of the N projectors 1 into the M small areas, and assign one of the videos to each of the small areas to make the projectors 1 display the videos when M<N is true, and assign one of the videos to each of the projection areas of the projectors 1 to make the projectors 1 display the videos when M=N is true.

According to the display control method and the PC 2D in the display system 1000 according to the second embodiment, it is possible to appropriately assign the videos to the large area 4 in accordance with the number of the videos output by the PCs and then display the videos due to the control by the PC 2D without placing a burden on the user who operates the PCs 2.

3. Other Embodiments

The first and second embodiments described above are each a preferred embodiment of the present disclosure. It should be noted that the present disclosure is not limited to the embodiments, and can be implemented with a variety of modifications within the scope or the spirit of the present disclosure.

For example, in each of the embodiments described above, there is described the configuration in which the display is performed setting one of the projectors 1 as the projector 1 subject to division when M>N is true, but it is possible to set two or more projectors 1 as the projectors subject to division. Further, the configuration of dividing the projection area 42 of the projector 1 subject to division is arbitrary, and it is possible to, for example, divide the projection area 42 into four small areas, and display the videos in three of the four small areas. Further, when dividing the large area 4 into the small areas, the small areas can be made different in size and resolution. In this case, it is possible to assign the video higher in priority to the small area larger in size.

The display device is not limited to the projector 1, and can be a light-emitting display device such as a liquid crystal display device which displays an image on a liquid crystal display panel, a display device which displays an image on an organic LE panel, a monitor, or a liquid crystal television. Further, it is possible to use a variety of types of display devices besides the above.

Further, it is possible to realize the functions of the PJ controller 11 and the PC controller 21 with a plurality of processors, or a semiconductor chip.

Further, each of the operators of the projector 1A, the PCs 2A, 2D shown in FIG. 2, FIG. 3, and FIG. 10 are those representing the functional configurations, and the specific installation forms are not particularly limited. In other words, it is not necessarily required to install the hardware individually corresponding to each of the operators, but it is obviously possible to adopt a configuration of realizing the functions of the plurality of operators by a single processor executing a program. Further, some of the functions realized by software in the embodiments and the modified examples described above can also be realized by hardware, and some of the functions realized by hardware can also be realized by software.

Further, the processing units of the flowcharts shown in FIG. 8 and FIG. 9 are obtained by dividing the processing of the PJ controller 11 in accordance with major processing contents in order to make the processing of the PJ controller 11 easy to understand, and the present disclosure is not at all limited by the way of dividing the processing into the processing units or the names of the processing units. The processing of the PJ controller 11 can be divided into a larger number of processing units, or can also be divided so that one processing unit includes a larger amount of processing in accordance with the processing contents. Further, the processing sequence of the flowcharts described above is not limited to the illustrated example. The same applies to the processing of the PC controller 21D.

It is possible to store the control program 121 to be executed by the PJ controller 11 and the control program 235 to be executed by the PC controller 21D in, for example, recording medium which stores the programs so as to be able to be retrieved by the projector 1A and the PC 2D. As the recording medium, there can be used a magnetic or optical recording medium, or a semiconductor memory device. Specifically, there can be cited a portable recording medium such as a flexible disk, a CD-ROM (Compact Disc Read Only Memory), a DVD (Digital Versatile Disc), a Blu-ray (registered trademark) disc, a magnetooptic disc, a flash memory, or a card-type recording medium, and a rigid recording medium. Further, it is possible to realize the display control method described above by storing these programs in a server device or the like, and then downloading the control programs from the server device to the projector 1A or the PC 2D.

What is claimed is:
1. A display control method comprising:
outputting, by at least one video output device, M videos, M being an integer larger than or equal to 1;
if M<N, displaying the M videos in each of M sub-areas by respectively assigning each of the M videos to each of the M sub-areas obtained by dividing a single large area in which an image is displayed by N display devices, N being an integer larger than or equal to 2;
if M=N, displaying each of the M videos by assigning each of the M videos to each of N display areas corresponding to the N display devices respectively, and if N<M, displaying each of N−1 videos out of the M videos by each of N−1 display devices out of the N display devices respectively by assigning each of the N−1 videos to each of the N−1 display devices.

2. The display control method according to claim 1, wherein two or more of the M videos are output from one of the video output devices.

3. The display control method according to claim 1, further comprising:
if N<M,
displaying each of M−N+1 videos excepting the N−1 videos from the M videos in each of sub-areas obtained by dividing a display area of one display device out of the N display device into M−N+1, the one display device being different from the N−1 display device, by assigning each of the M−N+1 videos to each of the sub-areas of the one display device respectively.

4. The display control method according to claim 3, further comprising:
determining priorities of the M videos; wherein
the M−N+1 videos are relatively low in the priority out of the M videos.

5. A display device comprising:
a communication interface which communicates with at least one video output device which outputs M videos M being an integer larger than or equal to 1, and N−1 external display devices N being an integer larger than or equal to 2 and
at least one processor programmed to execute
if M<N, respectively assigning each of the M videos to each of M sub-areas obtained by dividing a single large area in which an image is displayed by the display device and the N−1 external display devices,
if M=N, respectively assigning each of the M videos to each of N display areas corresponding to the display device and the N−1 external display devices, and
if N<M, displaying each of N−1 videos out of the M videos by each of N−1 display devices out of the N display devices respectively by assigning each of the N−1 videos to each of the N−1 display devices.

6. The display device according to claim 5, wherein the at least one processor is further programmed to:
if N<M,
display each of M−N+1 videos excepting the N−1 videos from the M videos in each of sub-areas obtained by dividing a display area of one display device out of the N display device into M−N+1, the one display device being different from the N−1 display device, by assigning each of the M−N+1 videos to each of the sub-areas of the one display device respectively.

7. The display device according to claim 6, wherein the at least one processor is further programmed to:
determine priorities of the M videos; wherein the M−N+1 videos are relatively low in the priority out of the M videos.

8. A video output device comprising:
a communication device which outputs M videos M being an integer larger than or equal 1 to N display devices N being an integer larger than or equal to 2; and
at least one processor programmed to execute
if M<N, respectively assigning each of the M videos to each of M sub-areas obtained by dividing a single large area in which an image is displayed by the N display devices,
if M=N, assigning the M videos respectively to N display areas corresponding to the N display devices, and
if N<M, displaying each of N−1 videos out of the M videos by each of N−1 display devices out of the N display devices respectively by assigning each of the N−1 videos to each of the N−1 display devices.

9. The video output device according to claim 8, wherein the at least one processor is further programmed to:
if N<M,
display each of M−N+1 videos excepting the N−1 videos from the M videos in each of sub-areas obtained by dividing a display area of one display device out of the N display device into M−N+1, the one display device being different from the N−1 display device, by assigning each of the M−N+1 videos to each of the sub-areas of the one display device respectively.

10. The video output device according to claim 9, wherein the at least one processor is further programmed to:
determine priorities of the M videos; wherein
the M−N+1 videos are relatively low in the priority out of the M videos.

* * * * *